(12) United States Patent
Singh et al.

(10) Patent No.: US 12,329,344 B2
(45) Date of Patent: Jun. 17, 2025

(54) SYSTEM COMPRISING A DISHWASHER, METHOD FOR OPERATING A DISHWASHER, AND COMPUTER PROGRAM PRODUCT

(71) Applicant: BSH Hausgeräte GmbH, Munich (DE)

(72) Inventors: Kuldeep Narayan Singh, Dillingen a.d. Donau (DE); Kai Paintner, Welden (DE); Michael Rupp, Holzheim (DE)

(73) Assignee: BSH Hausgeräte GmbH, Munich (DE)

( * ) Notice: Subject to any disclaimer, the term of this patent is extended or adjusted under 35 U.S.C. 154(b) by 203 days.

(21) Appl. No.: 17/926,151

(22) PCT Filed: May 27, 2021

(86) PCT No.: PCT/EP2021/064145
§ 371 (c)(1),
(2) Date: Nov. 18, 2022

(87) PCT Pub. No.: WO2021/254758
PCT Pub. Date: Dec. 23, 2021

(65) Prior Publication Data
US 2023/0190071 A1    Jun. 22, 2023

(30) Foreign Application Priority Data

Jun. 18, 2020 (DE) .......................... 102020207578.6

(51) Int. Cl.
*A47L 15/42* (2006.01)
*A47L 15/00* (2006.01)
(Continued)

(52) U.S. Cl.
CPC ....... *A47L 15/4295* (2013.01); *A47L 15/0028* (2013.01); *A47L 15/0063* (2013.01);
(Continued)

(58) Field of Classification Search
CPC ............ A47L 15/4295; A47L 15/0028; A47L 15/0063; A47L 15/18; A47L 15/46;
(Continued)

(56) References Cited

U.S. PATENT DOCUMENTS

| 7,524,380 B1 | 4/2009 | Duri |
| 2011/0017235 A1* | 1/2011 | Berner ................ A47L 15/4234 134/18 |

(Continued)

FOREIGN PATENT DOCUMENTS

| CN | 107729816 A | * 2/2018 | ......... A47L 15/4293 |
| CN | 109620078 A | 4/2019 | |

(Continued)

OTHER PUBLICATIONS

CN-107729816—A Written Description (Year: 2018).*

(Continued)

*Primary Examiner* — Eric W Golightly

(74) *Attorney, Agent, or Firm* — Michael E. Tschupp; Andre Pallapies; Brandon G. Braun

(57) ABSTRACT

A system includes a dishwasher having a receptacle for items to be washed, an image capturing facility configured to capture an image of the receptacle of the dishwasher for items to be washed, and an image processing facility configured to determine in dependence upon the captured image a map of an arrangement of the items to be washed. The map includes a division of the receptacle into a number of regions, with each region having a predetermined arrangement of items to be washed from a number of predetermined (Continued)

arrangements of items to be washed. An allocation unit determines a cleaning matrix including an allocation of a treatment specification to each of the regions in the map, and outputs the cleaning matrix. A control apparatus executes a wash program based on the cleaning matrix.

20 Claims, 6 Drawing Sheets

(51) Int. Cl.
| | |
|---|---|
| *A47L 15/18* | (2006.01) |
| *A47L 15/46* | (2006.01) |
| *G06V 10/82* | (2022.01) |
| *G06V 20/50* | (2022.01) |
| *H04N 5/262* | (2006.01) |
| *H04N 7/18* | (2006.01) |

(52) U.S. Cl.
CPC ............... *A47L 15/18* (2013.01); *A47L 15/46* (2013.01); *G06V 10/82* (2022.01); *G06V 20/50* (2022.01); *H04N 5/2628* (2013.01); *H04N 7/183* (2013.01); *A47L 2401/04* (2013.01); *A47L 2501/04* (2013.01); *A47L 2501/06* (2013.01); *A47L 2501/20* (2013.01)

(58) Field of Classification Search
CPC ............. A47L 2401/04; A47L 2501/04; A47L 2501/06; A47L 2501/20; A47L 2501/26; A47L 2501/36; G06V 10/82; G06V 20/50; H04N 5/2628; H04N 7/183
See application file for complete search history.

(56) References Cited

U.S. PATENT DOCUMENTS

| | | | |
|---|---|---|---|
| 2011/0264305 A1* | 10/2011 | Choe | G05D 1/0246 701/28 |
| 2012/0138092 A1 | 6/2012 | Ashrafzadeh | |
| 2017/0071440 A1* | 3/2017 | Berner | A47L 15/46 |
| 2018/0214001 A1 | 8/2018 | Wöbkemeier | |
| 2019/0200841 A1 | 7/2019 | Yoshimoto | |
| 2019/0370691 A1* | 12/2019 | Chae | A47L 11/4061 |
| 2020/0301382 A1* | 9/2020 | Fawaz | G06T 7/73 |
| 2020/0337516 A1 | 10/2020 | Frank | |

FOREIGN PATENT DOCUMENTS

| | | | | |
|---|---|---|---|---|
| CN | 110245459 A | * | 9/2019 | ........... B08B 7/0042 |
| CN | 110876602 A | | 3/2020 | |
| EP | 1238622 A2 | | 9/2002 | |

OTHER PUBLICATIONS

CN-110245459—A Written Description (Year: 2019).*
International Search Report PC/EP2021/064145 dated Aug. 5, 2021.
National Search Report DE 102020207578.6 dated Jun. 11, 2021.

* cited by examiner

SYSTEM COMPRISING A DISHWASHER, METHOD FOR OPERATING A DISHWASHER, AND COMPUTER PROGRAM PRODUCT

CROSS-REFERENCES TO RELATED APPLICATIONS

This application is the U.S. National Stage of International Application No. PCT/EP2021/064145, filed May 27, 2021, which designated the United States and has been published as International Publication No. WO 2021/254758 A1 and which claims the priority of German Patent Application, Serial No. 10 2020 207 578.6, filed Jun. 18, 2020, pursuant to 35 U.S.C. 119 (a)-(d).

The contents of International Application No. PCT/EP2021/064145 and German Patent Application, Serial No. 10 2020 207 578.6 are incorporated herein by reference in their entireties as if fully set forth herein.

BACKGROUND OF THE INVENTION

The present invention relates to a system having a dishwasher, a method for operating a dishwasher and a computer program product.

In order to increase the cleaning efficiency of a dishwasher, it is advantageous if selective wash program parameters are set for specific items to be washed or for a specific arrangement of items to be washed. Conventional dishwashers frequently operate with a hydraulically driven spray arm which sprays washing liquor uniformly, i.e. without local selectivity, into the dishwasher interior and onto the items to be washed that are arranged therein. This can result, by way of example, in a washing liquor pressure not being sufficient in order in the case of plates standing close to one another to convey a sufficient quantity of washing liquor into the intermediate space between two plates.

EP 1 238 622 B1 discloses a dishwasher having a rotatably mounted spray facility, wherein a control facility is provided that controls the rotation of the spray facility in an angle-dependent manner, in other words the angle speed of the washing facility is dependent upon the instantaneous angle of the spray facility, said angle being between 0 and 360° during rotation. It is possible in this manner to realize locally different treatment intensities.

Furthermore, dishwashers are known that have locally fixedly predetermined intensive wash zones, wherein particularly contaminated items to be washed are placed in these intensive wash zones in order to be intensively cleaned.

BRIEF SUMMARY OF THE INVENTION

Based on this background, one object of the present invention is to further improve the cleaning of items to be washed using a dishwasher.

In accordance with a first aspect, a system having a dishwasher, in particular a household dishwasher, is proposed. The system comprises an image capturing facility for capturing an image of a receptacle of the dishwasher for items to be washed, an image processing facility for determining in dependence upon the captured image a map of the arrangement of items to be washed, wherein the map of the arrangement of items to be washed comprises a division of the receptacle for items to be washed into a number of regions, wherein a respective region comprises a predetermined arrangement of items to be washed from a number of predetermined arrangements of items to be washed, and an allocation unit for determining a cleaning matrix, which comprises an allocation of a treatment specification to each of the regions in the map of the arrangement of items to be washed, and for outputting the cleaning matrix. A control apparatus of the dishwasher is configured so as to execute a wash program on the basis of the cleaning matrix.

This system has the advantage that each region of the receptacle for items to be washed is treated in dependence upon the arrangement of items to be washed in a respective region in accordance with a treatment specification which is particularly well suited for washing the prevailing arrangement. The respective treatment specification is determined in such a manner that the items to be washed that are arranged accordingly are cleaned in a particularly efficient manner. It could be said that the system renders possible a spatially selective treatment which is performed with optimized efficiency. Overall, it is possible to achieve optimized cleaning of the items to be washed whilst simultaneously increasing the efficiency of the dishwasher.

The image capturing facility is by way of example a digital camera that is configured so as to capture and output a digital image that has by way of example a resolution of at least 1 MP (MP=megapixel) preferably at least 5 MP, further preferred greater than 8 MP. It is preferred that the image capturing facility comprises an image sensor with an extended spectral range that has by way of example a sensitivity in the range between 2500 nm-250 nm. The image capturing facility comprises preferably moreover a lens that is configured so as to capture on the image sensor the receptacle for items to be washed (or the receptacles for items to be washed, insofar as the dishwasher has multiple receptacles for items to be washed). It is preferred that the image capturing facility captures the image of the receptacle for items to be washed if it is arranged in a predetermined position. The image capturing facility can moreover comprise an illuminating unit in order while the image is being captured to illuminate the receptacle for items to be washed.

The image processing facility can be implemented in terms of hardware technology and/or in terms of software technology. When implemented in terms of hardware technology, the image processing facility can be designed by way of example as a computer or as a microprocessor. When implemented in terms of software technology, the image processing facility can be designed as a computer program product, as a function, as a routine, as part of a program code or as an executable object.

The image processing facility receives the image of the receptacle for items to be washed that is captured by the image capturing facility and performs by way of example an image analysis. The image analysis can include in particular pattern recognition, discrimination between image areas in dependence upon spectral information, transformation of the image and more of the like. In this manner, the image processing facility determines a map of the arrangement of items to be washed.

In order to determine the map of the arrangement of items to be washed, the image processing facility analyzes by way of example the captured image, wherein arrangements of items to be washed are detected in the image. A respective arrangement of items to be washed can comprise in particular information with regard to a spatial orientation of the items to be washed, a type of items to be washed, a form of items to be washed and/or with regard to a material of items to be washed. The detected arrangements of items to be washed correspond in this case in particular to predetermined arrangements of items to be washed.

A predetermined arrangement of items to be washed is specified by way of example by a set of parameters, wherein by way of example an orientation parameter can be provided for indicating the spatial orientation of the items to be washed, a type parameter for indicating the type of items to be washed, a form parameter for indicating the form of items to be washed and/or a material parameter for indicating the material of items to be washed.

The map of the arrangement of items to be washed comprises a division of the receptacle for items to be washed into a number of regions. In this case, a respective region has a predetermined arrangement of items to be washed from the number of predetermined arrangements of items to be washed. By way of example, each pixel of the image of the receptacle for items to be washed is allocated to a predetermined arrangement of items to be washed. All the pixels that are allocated to a first predetermined arrangement of items to be washed form a first area, all the pixels that are allocated to a second predetermined arrangement of items to be washed form a second area, and so forth. Each pixel of the image corresponds in this case to a position in the receptacle for items to be washed.

By way of example, a first region is determined in which multiple porcelain plates are arranged upright one behind the other in the receptacle for items to be washed and a second region is determined in which an iron frying pan is arranged with the cooking surface facing downward in the receptacle for items to be washed.

The number of predetermined arrangements of items to be washed comprises in particular predetermined arrangements that are predetermined by way of example by the manufacturer of the dishwasher and/or by the user of the dishwasher. In this case, similar arrangements of items to be washed which can be efficiently cleaned using an identical or similar treatment specification are combined to form a predetermined arrangement of items to be washed. On the other hand, different arrangements of items to be washed which are efficiently cleaned using different treatment specifications can be taken into consideration by different predetermined arrangements of items to be washed. It is by way of example advantageous to differentiate between the upright plates and the flat-lying frying pan, since these can be particularly efficiently cleaned using different treatment specifications.

The allocation unit can be implemented in terms of hardware technology and/or software technology. When implemented in terms of hardware technology, the allocation unit can be designed for example as a computer or as a microprocessor. When implemented in terms of software technology, the allocation unit can be designed as a computer program product, as a function, as a routine, as part of a program code or as an executable object.

The allocation unit is configured so as to allocate a respective treatment specification to each one of the regions in the map of the arrangement of items to be washed, said map having been determined by the image processing facility. It can also be said that each region is allocated a specific treatment specification. The specific treatment specification comprises in this case in particular a set of treatment parameters which determine the treatment specification. The treatment parameters include by way of example a washing liquor pressure, a spray angle at which the washed liquor is discharged, a treatment duration, a washed liquor temperature, a cleaning agent quantity, and more of the like. Each treatment parameter that influences a cleaning result can be predetermined in the treatment specification.

Since the arrangement of items to be washed is known in a respective region, it is possible to specify the treatment specification for the region so that the cleaning is optimized. If the predetermined arrangement of items to be washed is determined by one or multiple parameters, the treatment parameters, by way of example, can be determined so as to specify the treatment specification as a function of these parameters. In addition and/or as an alternative, it is possible to allocate a specific treatment specification for a predetermined arrangement of items to be washed, said treatment specification then being allocated to the corresponding region.

The treatment specification for a respective region comprises in this case preferably a complete wash program with regard to the region. In this case, different treatment specifications for different regions can be identical by way of example in individual part program steps, such as for example a pre-wash, a main wash, a rinse and a drying step.

The cleaning matrix that is obtained by means of this allocation can also be described as a treatment map, since each position in the receptacle for items to be washed is allocated a specific treatment specification and consequently a spatially selective wash program.

The control apparatus can be implemented in terms of hardware technology and/or in terms of software technology. When implemented in terms of hardware technology, the control apparatus can be designed for example as a computer or as a microprocessor. When implemented in terms of software technology, the control apparatus can be designed as a computer program product, as a function, as a routine, as part of a program code or as an executable object.

The control apparatus is configured so as to execute a wash program on the basis of the cleaning matrix. For this purpose, the control apparatus accordingly controls the respective component of the dishwasher, by way of example, a circulation pump, a water softener, an actuator, a heating apparatus, an automatic metering system, a drying facility, a valve and more of the like. In this case, the regions of the receptacle for items to be washed are treated according to the division in accordance with the map of the arrangement of items to be washed and according to the respective treatment specification.

The image processing facility and the allocation unit can be implemented in particular jointly with the control apparatus and/or have therewith joint resources such as for example a calculating unit, a data bus, a work storage device and more of the like.

By virtue of this spatially selective treatment, the dishwasher can be operated in a very efficient manner. By way of example, the dishwasher can also efficiently execute a wash program when only partly loaded with items to be washed, in that selectively only the region of the receptacle for items to be washed in which the items to be washed are arranged is treated.

In accordance with one embodiment of the system, this comprises a transformation unit that is configured so as to transform the captured image and to output a transformed image and/or to generate an image in dependence upon the captured image and to output a generated image, wherein the image processing facility is configured so as to determine the map of the arrangement of items to be washed on the basis of the transformed image or the generated image.

The transformed image and/or the generated image can be advantageously acquired in such a manner that the determination of the map of the arrangement of items to be washed by the image processing facility is improved.

The transformation unit is preferably part of the image processing facility.

Transforming the image includes by way of example rectifying a distorted image, converting the image from a first coordinate system into a second coordinate system, amplifying a contrast, performing an edge recognition and more of the like.

Generating an image includes in particular generating an image by means of a generating specification. The generating specification can in this case be learned by the transformation unit with the aid of machine learning. In particular, the generating specification can be adapted in an adaptive manner by the transformation unit. In this manner, the generating specification can be adapted to the individual requirements of the dishwasher in individual households.

In addition, the generating specification can include transforming the image.

In accordance with a further embodiment of the system, the transformation unit comprises a neural network, in particular a generating generic network.

The neural network can be trained preferably using a set of training data.

In accordance with a further embodiment of the system, the image capturing facility is arranged on the dishwasher in such a manner that the image capturing facility captures the image of the receptacle for items to be washed from an upper hemisphere with regard to the receptacle for items to be washed.

The upper hemisphere relates in this case to an intended arrangement of the dishwasher with regard to the gravitation, wherein the dishwasher is placed with its lower side or its base on the floor.

By way of example, the dishwasher comprises a dishwasher cavity having a dishwasher cavity flange that surrounds a loading opening of the dishwasher cavity, wherein the image capturing facility is arranged in or on an upper flange section of the dishwasher cavity flange that is allocated to a ceiling of the dishwasher cavity, and wherein the image capturing facility faces away from the dishwasher cavity and obliquely in the direction of a plane that extends from the base of the dishwasher cavity.

This arrangement of the image capturing facility is advantageous, since this is consequently arranged outside a region that is accessible by the washing liquor, for which reason the environmental conditions can also be controlled in a relatively simple manner for delicate electronic components. The dishwasher cavity flange is preferably located outside a dishwasher interior that is sealed by means of a sealing facility.

In accordance with a further embodiment of the system, the transformation unit is configured so as to generate an image of the receptacle for items to be washed and said image corresponds to a view of the receptacle for items to be washed from a lower hemisphere, in particular in a perpendicular manner from below.

The lower hemisphere relates in this case to an intended arrangement of the dishwasher with regard to the gravitation, wherein the dishwasher is placed with its lower side or its base on the floor. It can also be said that the transformation unit is configured so as to generate a lower view of the receptacle for items to be washed in dependence upon a top view of the receptacle for items to be washed.

This embodiment is particularly advantageous in the case of a dishwasher whose spray apparatus is arranged below the receptacle for items to be washed. Furthermore, it is difficult to arrange the image capturing facility in such a manner that this directly captures an image from below of the receptacle for items to be washed, since it is hardly possible to maintain a distance that is required for capturing the image and since dirt can collect on a correspondingly arranged image capturing facility and consequently can distort the image capturing.

In accordance with a further embodiment of the system, this comprises a pattern recognition unit that is configured so as to recognize patterns that are present in the captured image, in the transformed image or in the generated image and to output a pattern image that comprises the recognized pattern, wherein the image processing facility is configured so as on the basis of the pattern image to determine the map of the arrangement of items to be washed.

The pattern recognition unit is preferably a component of the image processing facility.

A pattern consists for example of parallel lines, which can also have an angle with regard to a predetermined reference direction, of curved lines, of lines that stand perpendicular with respect to one another, of a geometric form, such as a circle, a rectangle, an ellipse and the like, and also combinations thereof.

It is possible from a pattern to conclude by way of example an orientation of the items to be washed. It is thus possible to conclude from parallel lines by way of example an arrangement of plates that are placed one behind the other.

In accordance with a further embodiment of the system, the image processing facility is configured so as to determine a type of items to be washed and/or a material of items to be washed.

The more these characteristics of the items to be washed are known, the more precisely the treatment specification for can be determined. By way of example, it is advantageous to select different parameters for items to be washed that are made from glass than for items to be washed that are made of metal.

In accordance with a further embodiment of the system, the map of the arrangement of items to be washed comprises at each point information relating to a type of items to be washed, a material of items to be washed, a form of items to be washed and/or a spatial orientation of the items to be washed at the respective point.

Based on this information that can be available by way of example as parameter values with regard to a predetermined scale, the predetermined arrangement of items to be washed can be determined for each point on the map of the arrangement of items to be washed.

The type of items to be washed comprises by way of example information as to whether they are a pot, a dish, a plate, an item of cutlery, a drinking vessel and more of the like.

In accordance with a further embodiment of the system, the dishwasher has a spray apparatus, in particular a spray arm, which is allocated to the receptacle for items to be washed, so as to spray washing liquor onto the items to be washed that are arranged in the receptacle for items to be washed, wherein a position of the spray apparatus can be adjusted, in particular controlled, relative to the receptacle for items to be washed The position includes both a spatial position of the spray apparatus in the dishwasher cavity, such as an angle of rotation in the case of a spray arm, and also an orientation of the spray apparatus, such as an incline of the spray arm in a perpendicular manner with respect to the direction in which it extends. It is possible by adjusting the incline, to adjust for example a direction in which the wash liquor is sprayed.

It is preferred that the dishwasher comprises for this purpose a spray apparatus that can be controlled in a motorized manner and that has at least one axle, preferably at least two axles, having an adjustable placing position of a respective axle.

In accordance with a further embodiment of the system, the dishwasher has a hydraulic system that comprises at least one intensive wash zone that can optionally be activated in dependence upon the map of the arrangement of items to be washed.

An intensive wash zone can be spatially fixed, by way of example at a specific position of the receptacle for items to be washed or regarding said receptacle for items to be washed, and/or it can be a spatially variable intensive wash zone. In the case of a spatially variable intensive wash zone, this can preferably likewise be controlled in a motorized manner, by way of example regarding its position and/or orientation.

The intensive wash zone can be operated, in other words washing liquor can be sprayed into said intensive wash zone, in the stand-alone operation or in combination with a spray apparatus.

In accordance with a further embodiment of the system, the treatment specification that is allocated to a respective region includes establishing a parameter value from a predetermined value range and/or a temporal variation of the parameter value for one or multiple treatment parameters comprising a washing liquor spraying pressure, a washing liquor temperature, a spray apparatus position, a spray apparatus orientation and/or a duration during which the washing liquor is sprayed.

The washing liquor spraying pressure is influenced by way of example by a rotational speed of a circulation pump. A temporal variation of a parameter value includes by way of example moving the spray apparatus to and fro in a specific region, wherein by way of example a specific speed can be predetermined for the movement. Furthermore, a specific number of repetitions can be predetermined.

In accordance with a further embodiment of the system, a specific treatment specification is allocated to a respective predetermined arrangement of items to be washed of the number. This is understood to mean that the allocation is predetermined in a fixed manner. This has the advantage that by way of example on the basis of empirical tests an optimum treatment specification for a respective predetermined arrangement of items to be washed can be determined, which is used accordingly. Such an allocation reduces in particular the resources that are required for the allocation unit.

In embodiments of the system, the image processing facility comprises an incorrect-loading detection unit that is configured so as in dependence upon the captured image, the transformed image and/or the generated image to detect when items to be washed are in an arrangement that is unsuitable for washing the items to be washed and to output a detection signal, wherein the dishwasher has an output unit that is configured so as to output a warning signal to a user of the dishwasher in response to the detection signal.

An incorrect loading is understood to mean in particular an arrangement of items to be washed that predictably leads to an insufficient wash result. One example for this is a largely overlapping arrangement of two items to be washed, with the result that the washing liquor does not reach the intermediate space between the items to be washed or only insufficient washing liquor reaches it. A pot that has an upward facing opening and in which the washing liquor can collect is also an example of an incorrect loading.

In accordance with a further embodiment of the system, this has a facility which is external to the dishwasher and which integrates at least the image processing facility, wherein the dishwasher has a communication unit that is configured so as to transmit the captured image to the external facility and to receive the map of the arrangement of items to be washed from the external facility.

In accordance with a further embodiment, the image processing facility is designed as part of an app that can be installed on the external facility.

The external facility is for example a mobile device, which can also be described as a mobile terminal, or also a server. The mobile device is by way of example a Smartphone, a tablet or a tablet computer. The app can also be described as an application, application software or as an application program. The app can be designed in particular as a program, as a computer program, as software, as a computer program product, as a function, as a routine, as part of a program code or as an executable object.

In particular, the dishwasher comprises a communication unit that can be coupled by way of example by means of a network to the external facility. The network comprises in this case in particular a mobile radio network, a WLAN, the Internet and/or a further cableless or cable-connected data network.

In accordance with a second aspect, a method for operating a dishwasher, in particular a household dishwasher, is proposed. In a first step, an image of a receptacle for items to be washed is captured. In a second step, a map of the arrangement of items to be washed is determined in dependence upon the captured image, wherein the map of the arrangement of items to be washed has a division of the receptacle for items to be washed into a number of regions, wherein a respective region comprises a predetermined arrangement of items to be washed from a number of predetermined arrangements of items to be washed. In a third step, a cleaning matrix is determined which comprises an allocation of a treatment specification to each of the regions in the map of the arrangement of items to be washed. In a fourth step, the cleaning matrix is output. In a fifth step, a wash program is executed on the basis of the cleaning matrix.

This method is preferably performed with a dishwasher in accordance with the first aspect. The method has the same advantages that are explained regarding the dishwasher of the first aspect.

The features and embodiments that are described for the proposed dishwasher apply accordingly for the proposed method.

Furthermore, a computer program product is proposed which comprises commands that during the execution of the program by a computer cause the computer to perform the method described above.

A computer program product, such as for example a computer program means, can be made available or delivered by way of example as a storage medium, such as for example a memory card, USB stick, CD-ROM, DVD, or also in the form of a file that can be downloaded from a server in a network. This can be performed for example in a wireless communication network by transmitting a corresponding file having the computer program product or the computer program means.

Further possible implementations of the invention also comprise combinations, not explicitly mentioned, of features or embodiments that are described above or below regarding the exemplary embodiments. In his case, the person skilled in the art also added individual aspects as improvements or additions to the respective basic form of the invention.

BRIEF DESCRIPTION OF THE DRAWINGS

Further advantageous embodiments and aspects of the invention are subject matter of the subordinate claims and of exemplary embodiments of the invention described below. Furthermore, the invention is explained in detail with the aid of the preferred embodiments with reference to the attached figures.

DETAILED DESCRIPTION OF EXEMPLARY EMBODIMENTS OF THE PRESENT INVENTION

Figure 1:
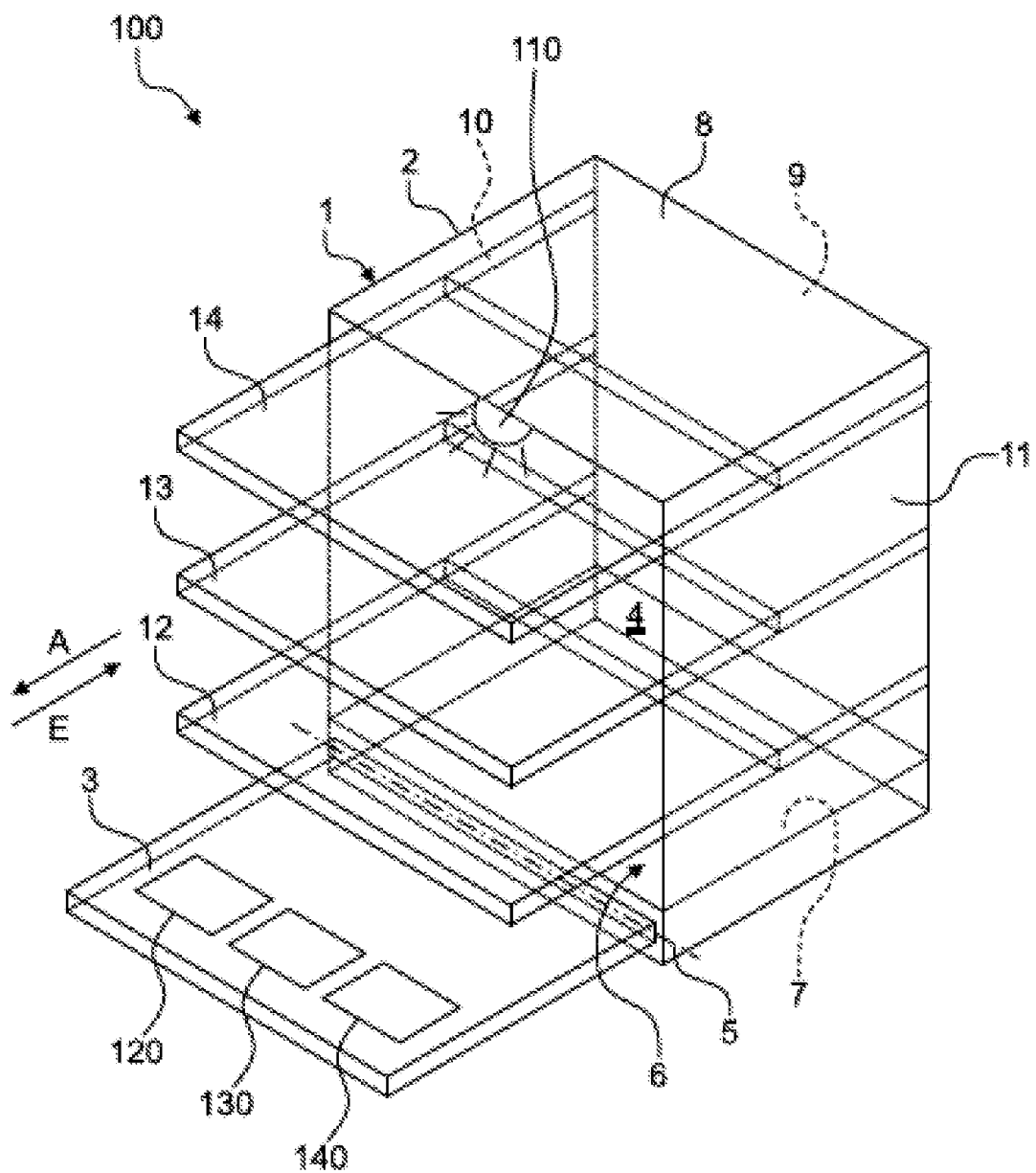
FIG. 1 shows a schematic perspective view of an embodiment of a system having a dishwasher.

In the figures, like or like-functioning elements are provided with the same reference characters, unless otherwise stated.

FIG. 1 illustrates a schematic perspective view of an embodiment of a dishwasher 1 that is designed here as a household dishwasher. The household dishwasher 1 comprises a dishwasher cavity 2 that can be sealed by a door 3, in particular in a water-tight manner. For this purpose, a sealing facility is provided between the door 3 and the dishwasher cavity 2. The dishwasher cavity 2 is preferably cube-shaped. The dishwasher cavity 2 can be arranged in a housing of the household dishwasher 1. The dishwasher cavity 2 and the door 3 can form a dishwasher interior 4 for washing items to be washed 21-25 (cf. FIG. 2 or 6).

The door 3 is illustrated in its open position in FIG. 1. The door 3 can be closed or opened by pivoting about a pivot axis 5 that is provided on a lower end of the door 3. A loading opening 6 of the dishwasher cavity 2 can be closed or opened with the aid of the door 3, The dishwasher cavity 2 has a base 7, a ceiling 8 that is arranged opposite the base 7, a rear wall 9 that is arranged opposite the closed door 3 and two side walls 10, 11 that are arranged mutually opposite one another. The base 7, the ceiling 8, the rear wall 9 and the side walls 10, 11 can be manufactured for example from a stainless steel sheet. Alternatively, the base 7 can be manufactured by way of example from a plastics material.

The household dishwasher 1 has moreover at least one receptacle 12 to 14 for items to be washed. It is preferred that multiple, by way of example three, receptacles 12-14 for items to be washed can be provided, wherein the receptacle 12 for items to be washed can be a lower receptacle for items to be washed or a lower basket, the receptacle 13 for items to be washed can be an upper receptacle for items to be washed or an upper basket and the receptacle 14 for items to be washed can be a cutlery drawer. As is furthermore illustrated in FIG. 1, the receptacles 12-14 for items to be washed are arranged one above the other in the dishwasher cavity 2. Each receptacle 12-14 for items to be washed can be moved selectively into or out of the dishwasher cavity 2. In particular, each receptacle 12-14 for items to be washed can be pushed or moved in an insertion direction E into the dishwasher cavity 2 and withdrawn or moved out of the dishwasher cavity 2 in a withdrawal direction A opposite to the insertion direction.

An image capturing facility 110 is arranged in an upper region of a dishwasher cavity flange that surrounds the loading opening 6 of the dishwasher cavity 2. The image capturing facility 110 is designed as a digital camera. The digital camera 110 is placed centrally with regard to the loading opening 6 and has by way of example a wide-angle lens (not illustrated) that renders it possible to completely capture in one image IMG (cf. FIG. 2 or 7) each of the receptacles 12-14 for items to be washed if said receptacles are in the withdrawn state.

Furthermore, an image processing facility 120, an allocation unit 130 and a control apparatus 140 are arranged on the door 3. These are illustrated here separately from one another but they can also be jointly integrated in one element. In addition, the arrangement on the door 3 is only exemplary.

The image processing facility 120 is configured so as to determine a map MAP of the arrangement of items to be washed (cf. FIG. 2 or 7) in dependence upon the captured image IMG. The map MAP of the arrangement of items to be washed comprises a division of the respective receptacle 12-14 for items to be washed into a number of regions A1-A5 (cf. FIG. 2) wherein a respective region (A1-A5) comprises a predetermined arrangement D1-D9 (cf. FIG. 3) of items to be washed from a number of predetermined arrangements D1-D9 of items to be washed. The allocation unit 130 is configured so as to determine a cleaning matrix MX (cf. FIG. 2) which comprises an allocation of a treatment specification T1-T5 (cf. FIG. 2) to each of the regions A1-A5 in the map MAP of the arrangement of items to be washed and so as to output the cleaning matrix MX. The control apparatus 140 is configured so as to execute a wash program on the basis of the cleaning matric MX.

Figure 2:
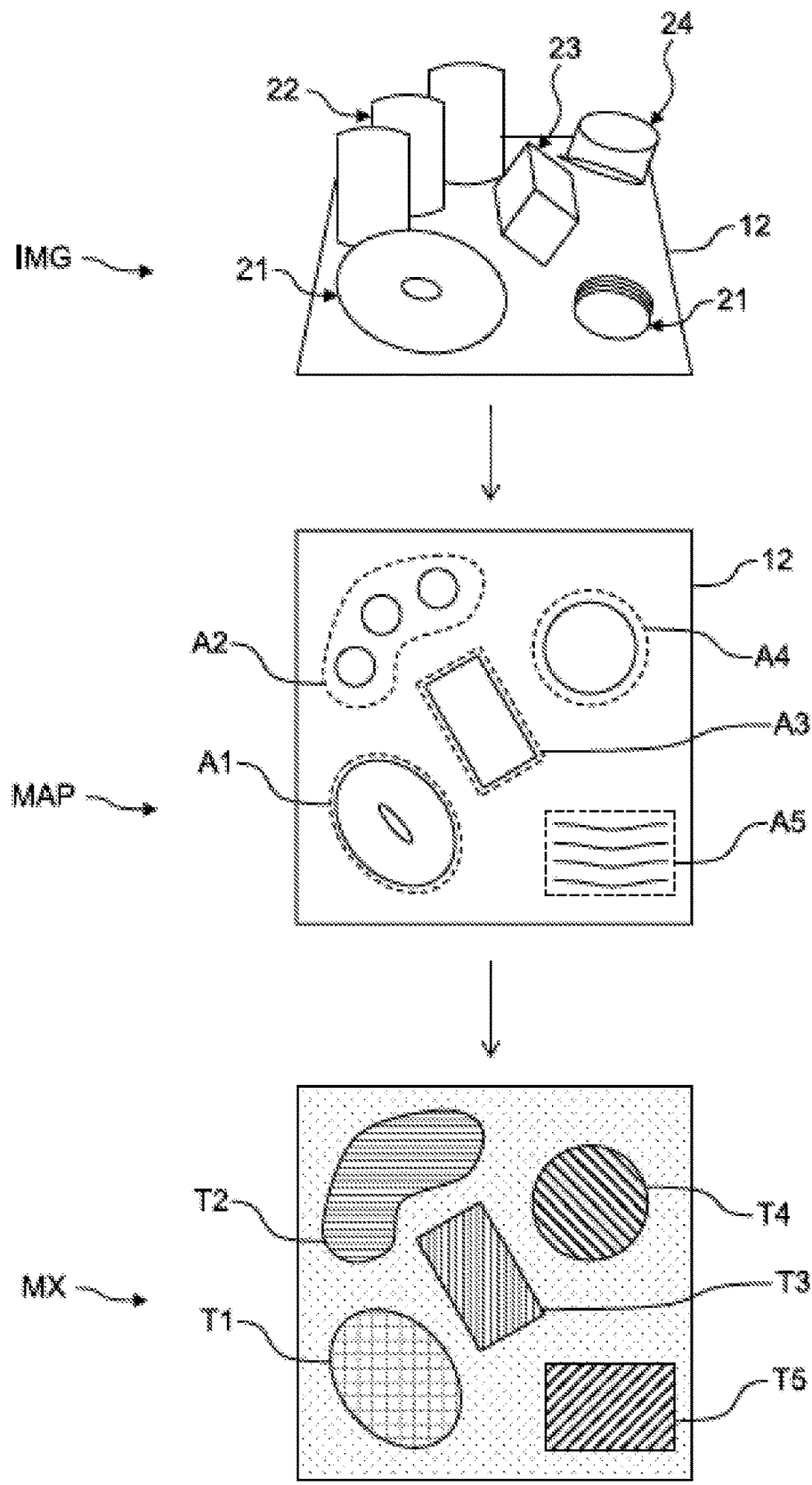
FIG. 2 shows schematically how an exemplary cleaning matrix is determined from an exemplary image of a dishwasher.

FIG. 2 illustrates schematically how a cleaning matrix MX is determined from an image IMG of a receptacle 12 for items to be washed, said image having been captured by way of example by the digital camera 110 (cf. FIG. 1) of the household dishwasher 1 in FIG. 1. The image IMG illustrates the receptacle 12 for items to be washed with the items to be washed 21-25 arranged thereon. The image IMG has a specific perspective which is why the items to be washed 21-25 are overlapping in part. The item to be washed 21 is by way of example a lid of a pot, the items to be washed 22 are by way of example three large drinking glasses, the item to be washed 23 is by way of example a storage box for food, the item to be washed 24 is by way of example a pot and the items to be washed 25 are by way of example multiple plates that are arranged one behind the other.

Figure 3:
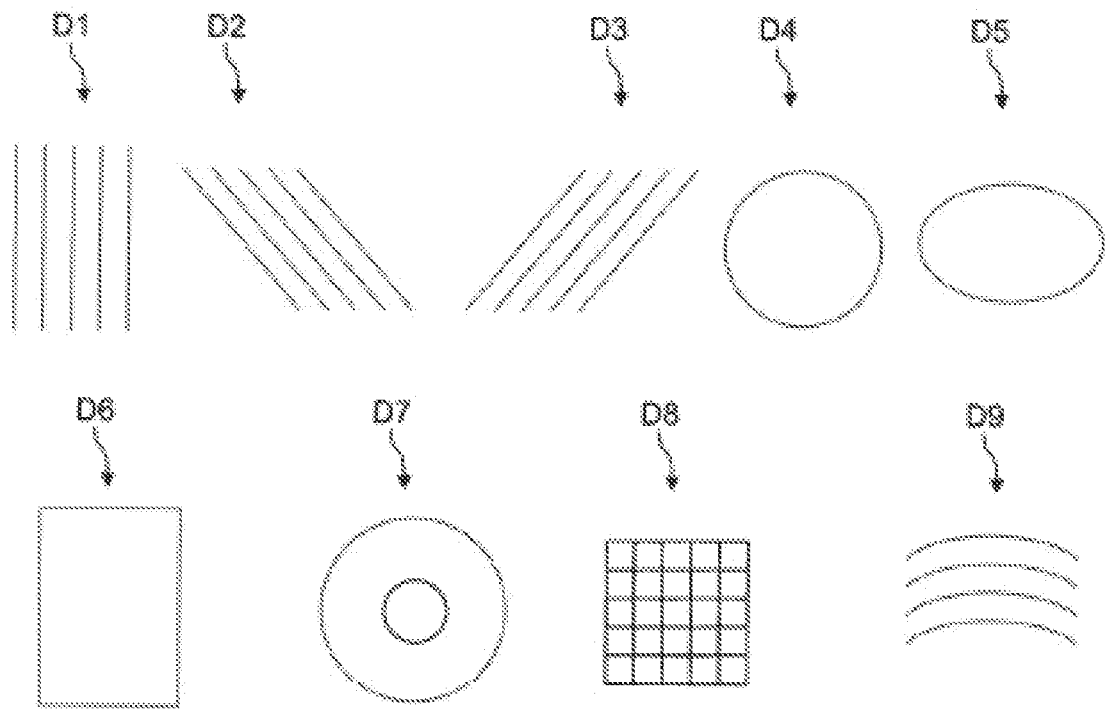
FIG. 3 shows an exemplary number of predetermined arrangements of items to be washed.

The image processing facility 120 (cf. FIG. 1) determines a map MAP of the arrangement of items to be washed which comprises a division of the receptacle 12 for items to be washed into regions A1-A5 having a predetermined arrangement D1-D9 of items to be washed (cf. FIG. 3). In this example, the map MAP of the arrangement of items to be washed corresponds to a view from below of the receptacle 12 for items to be washed. By way of example, the image processing facility 120 generates for this purpose in dependence upon the captured image IMG an image that illustrates from below the receptacle 12 for items to be washed and subsequently in this generated image allocates each pixel to a predetermined arrangement D1-D9 of items to be washed. The different regions A1-A5 are formed in this manner. The predetermined arrangements D1-D9 of items to be washed can differ from one another in the type, the form and the orientation of the items to be washed 21-25 but a material of items to be washed 21-25 can also be taken into consideration.

Each of these regions A1-A5 in the map MAP of the arrangement of items to be washed is allocated a treatment specification T1-T5. The respective allocated treatment specification T1-T5 is selected so that the items to be washed 21-25 that are arranged in the region A1-A5 are particularly efficiently cleaned. By way of example, the drinking vessels 22 are made of glass which is why a relatively low washing liquor spraying pressure and a relatively low washing liquor temperature are advantageous for said drinking vessels, since otherwise the glass wears out more. In contrast, an increased spraying pressure can be advantageous in the case of the plates 25 in order to completely spray washing liquor 154 (cf. FIG. 6) into the intermediate spaces. In the case of a pot lid 21 that is arranged in a slightly tilted manner, an oblique spraying direction (oblique with regard to a vertical axis) can be advantageous in order to efficiently wet all areas of the pot lid 21 with the washing liquor 154.

The cleaning matrix MX has by way of example the allocation that is indicated in Table 1.

TABLE 1

Allocation of parameter values for different treatment parameters to different regions. A respective line corresponds thereby to a treatment specification.

| Region | Spray pressure | Spray angle | Duration | Temperature |
|---|---|---|---|---|
| A1 | 60 | (+30°, −30°) | 1 min | 60° C. |
| A2 | 40 | 0° | 1 min | 45° C. |
| A3 | 60 | +10° | 1 min | 45° C. |
| A4 | 80 | 0° | 2 min | 60° C. |
| A5 | 100 | 0° | 4 | 60° C. |

In Table 1, the spray pressure is indicated by way of example as a percentage regarding a maximum spray pressure. The spray angle relates by way of example to a tilting of a spray arm 150, 152 (cf. FIG. 5 or 6) out of a horizontal orientation, wherein a spray angle of 0° represents a vertical spraying direction. The spray angle specification regarding region A1 is an interval, wherein the spray arm 150, 152 is preferably pivoted in this region multiple times. The duration relates to the period of time during which washing liquor 154 is sprayed into the respective region in the case of the quoted treatment parameter values. The temperature relates to the washing liquor temperature while it is being sprayed into the respective region.

The control apparatus 140 executes the wash program on the basis of the cleaning matrix MX, that means that each of the regions A1-A5 is treated in accordance with the allocated treatment specification T1-T5.

FIG. 3 illustrates an example of a number of predetermined arrangements D1-D9 of items to be washed. The arrangements D1-D9 that are illustrated here for items to be washed differ in particular in the orientation and the form of the items to be washed. It can be said that the illustrated arrangements D1-D9 of items to be washed each correspond to a basic type on the basis of which by way of example a preferred spraying direction can be determined for the washing liquor 154 (cf. FIG. 6). Such a basic type can be determined by way of example by pattern recognition. Further treatment parameters can be determined in dependence upon further characteristics of the items to be washed, such as a type and a material of items to be washed. In this respect there can be a plurality of different predetermined arrangements of items to be washed for a respective basic type.

It is to be noted that the number of predetermined arrangements D1-D9 of items to be washed is not limited to nine but rather can also be provided up to thirty, up to fifty, up to hundred or also more than a hundred different predetermined arrangements of items to be washed.

Figure 4:
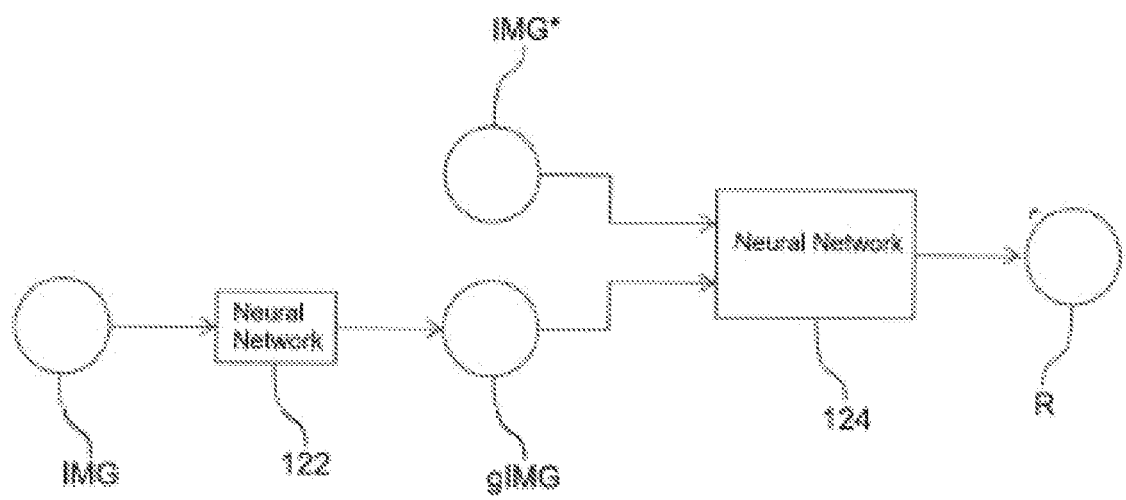
FIG. 4 shows a schematic block diagram of an arrangement for training a neural network.

FIG. 4 illustrates a schematic block diagram of an arrangement for training a neural network 122, 124. The neural network 122 is by way of example trained to the extent that it generates an image gIMG on the basis of a captured image IMG. The neural network 122 is an example of a transformation unit 122. By way of example, it is the image IMG of a receptacle 12 for items to be washed (cf. FIG. 2) that has been captured inclined from above and therefore has perspective distortions and the like, and the generated image gIMG is intended to illustrate in a view from below the receptacle 12 for items to be washed with the items to be washed 21-25 arranged therein (cf. FIG. 2).

This is for example a GAN (Generative Adversarial Network). In this case, two neural networks 122, 124 are trained. Image pairs are provided as training data, wherein in each case the image IMG of the receptacle 12 for items to be washed together with a further image IMG* which illustrates from below the receptacle 12 for items to be washed form a pair. The training data is preferably true images, wherein the arrangement of items to be washed is the same in both images. The neural network 122 is also called a generator, since it generates an artificial image gIMG. The generated image gIMG and the true image IMG* from below of the receptacle 12 for items to be washed are supplied to the neural network 124. The neural network 124 is also called a discriminator. The discriminator 124 decides which of the two supplied images IMG*, gIMG is the true image and outputs a corresponding result R. The generator 122 and the discriminator 124 are in a competitive situation: the generator 122 attempts to generate an image gIMG that the discriminator 124 considers to be the real image IMG*. In the case of a sufficiently large quantity of training data, the generator 122 is put in the position of generating an image gIMG that corresponds to an actual view from below of the receptacle 12 for items to be washed. The explained training method is known by way of example as a Pix2Pix model.

The generator 122 is by way of example a component of the image processing facility 122. It is advantageous to determine the map MAP of the arrangement of items to be washed (cf. FIG. 2 or 6) on the basis of the generated image gIMG, since then additional transformations or the like are not necessary in order to determine the cleaning matrix MX based on the map MAP of the arrangement of items to be washed (cf. FIG. 2).

Figure 5:
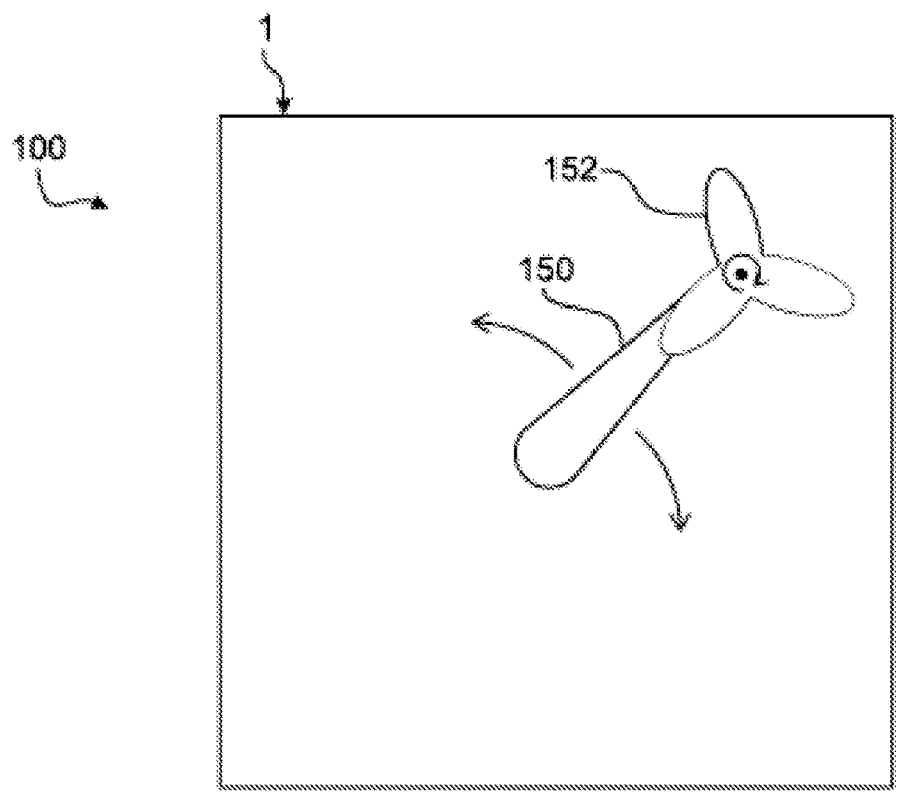
FIG. 5 shows a schematic view of a system having a dishwasher having a spray apparatus.

FIG. 5 illustrates a schematic view from above of a system 100 having a dishwasher 1 having a spray apparatus 150. This is by way of example the household dishwasher from FIG. 1. The spray apparatus 150 is by way of example designed as a spray arm, on the tip of which a satellite spray arm 152 is arranged. The spray arm 150 is by way of example arranged on a base 7 of the dishwasher 1 and is configured so as via the spray arm 150 to spray washing liquor onto the items to be washed 21-25 that are arranged in a receptacle 12 for items to be washed (cf. FIG. 1, 2 or 6). It is possible using a motor (not illustrated) to move the spray arm 150 into a predetermined rotational position and hold it there and/or it can be moved by the motor in accordance with a specific movement sequence. The satellite spray arm 152 can be arranged on the spray arm 150 in such a manner so as to be able to freely rotate, wherein by way of example the rebound of the sprayed washing liquor 154 (cf. FIG. 6) drives the satellite spray arm 152. By virtue of controlling the angle of rotation of the spray arm 150, each region of the receptacle 12 for items to be washed can be washed individual, in other words can be treated with a specific treatment specification.

An intensive wash zone is created in the region of the satellite spray 152 in that the spray arm 150 is moved into a specific rotational position and the spray arm 150 comprising the satellite spray arm 152 is charged with washing liquor 154. It is preferred that the spray arm 150 is in addition mounted so as to be able to rotate about an axis that extends in the radial direction regarding the direction of rotation, which is explained in detail below with the aid of FIG. 6.

Figure 6:
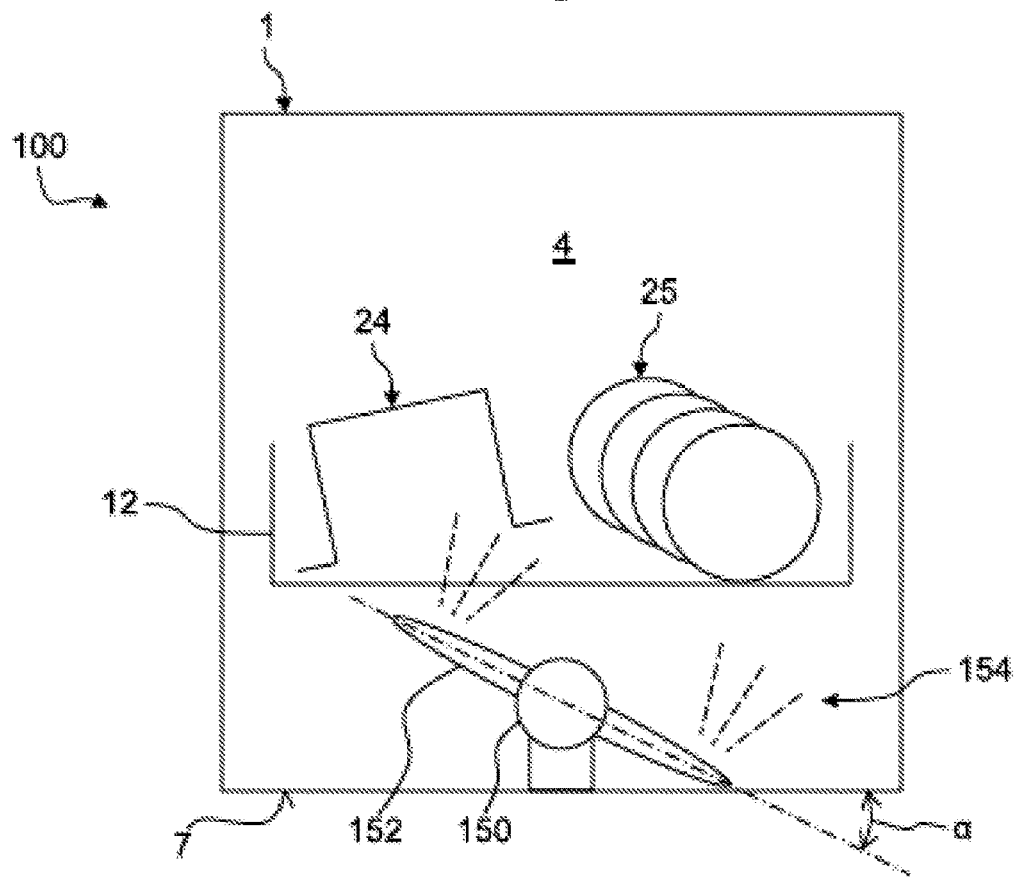
FIG. 6 shows schematically a system comprising a dishwasher.

FIG. 6 illustrates schematically a system 100 comprising a dishwasher 1. This is by way of example the household dishwasher from FIG. 1. A spray arm 150 that can be rotated by means of a motor and that has a satellite spray arm 152 on its tip is arranged on a base 7 of the dishwasher 1, as explained above with the aid of FIG. 5. A receptacle 12 for items to be washed that has items to be washed 21-25 arranged therein is arranged above the spray arm 150. The image processing facility 120 (cf. FIG. 1) has already determined a map MAP of the arrangement of items to be washed (cf. FIG. 2 or 7) and the allocation unit 130 (cf. FIG. 1) has already determined a cleaning matric MX (cf. FIG. 2). For the region of the plates 25, the treatment specification of the cleaning matrix MX comprises the specification that the spray arm 150 is to be tilted by an angle α with the result that the washing liquor 154 is sprayed at this angle α onto the items to be washed 25 in this region. This angle renders it possible for the washing liquor 154 to penetrate into an intermediate space between the plates 25 more efficiently and consequently the cleaning of the plates 25 is improved. The control apparatus 140 (cf. FIG. 1) controls the spray arm 150 according to the specification of the treatment specification for this region.

Figure 7:
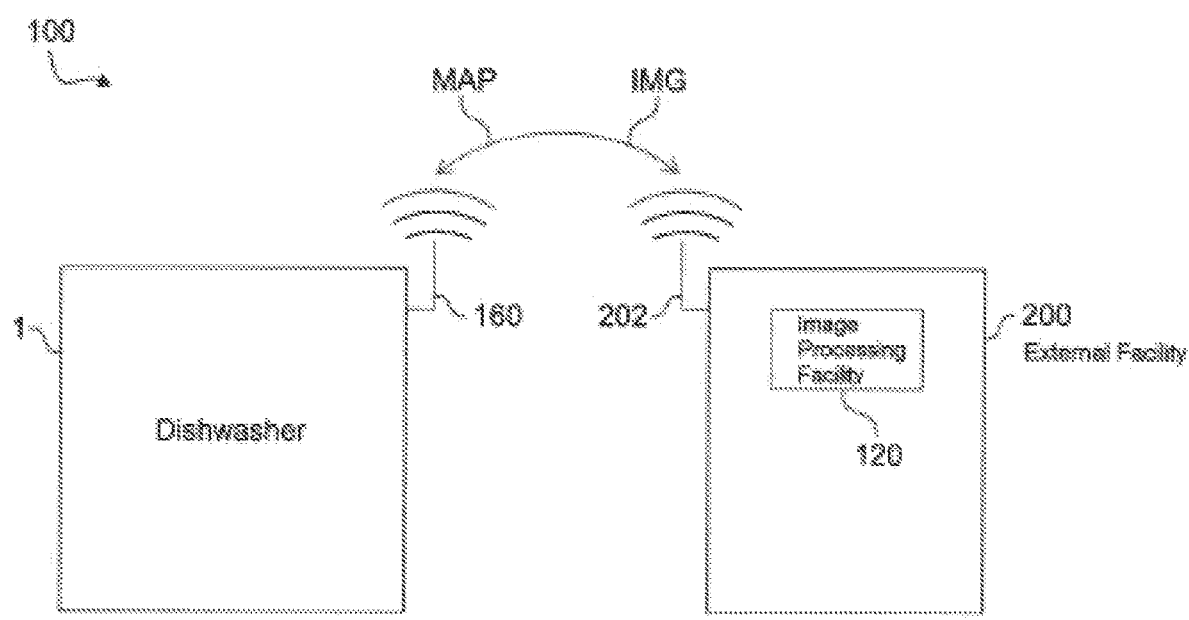
FIG. 7 shows a schematic view of a system having a dishwasher and an external facility.

FIG. 7 illustrates schematically a system 100 having a dishwasher 1 and an external facility 200. This is by way of example the household dishwasher 1 from FIG. 1. The external facility 200 can be designed as a server or as a mobile device. The dishwasher 1 comprises a communication unit 160 by means of which it is possible to produce a communication connection with a communication unit 202 of the external facility 200. In this example, the external facility 200 integrates the image processing facility 160.

The dishwasher 1 transmits the captured image IMG by means of the communication unit 160 to the external facility 200 that determines the map MAP of the arrangement of items to be washed in dependence upon the received image IMG. Subsequently, the dishwasher 1 receives via the communication unit 160 the determined map MAP of the arrangement of items to be washed.

This can be advantageous since the determination of the map MAP of the arrangement of items to be washed in dependence upon the captured image IMG can be a CPU-intensive procedure. In this case, it is not necessary that the dishwasher 1 has this computing power itself which is why this can be designed in a less complex manner.

In addition, the external facility 200 can also integrate the allocation unit 130 (cf. FIG. 1) and in lieu of the map MAP of the arrangement of items to be washed can determine the cleaning matrix MX (cf. FIG. 2) directly and send it to the dishwasher 1.

The presence of the external facility 200 does not exclude that the dishwasher 1 has an image processing facility 160.

Figure 8:
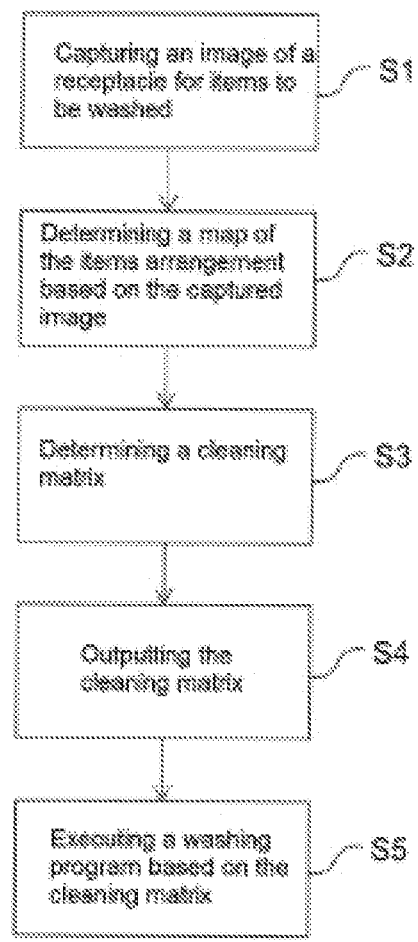
FIG. 8 shows a schematic block diagram of an exemplary embodiment of a method for operating a dishwasher.

FIG. 8 illustrates a schematic block diagram of an exemplary embodiment of a method for operating a dishwasher 1, by way of example the household dishwasher from FIG. 1. In a first step S1, an image IMG (cf. FIG. 2 or 7) of a receptacle 12-14 for items to be washed (cf. FIG. 1, 2 or 6) is captured. In a second step S2, a map MAP of the arrangement of items to be washed (cf. FIG. 2 or 7) is determined in dependence upon the captured image IMG, wherein the map MAP of the arrangement of items to be washed comprises a division of the receptacle 12-14 for items to be washed into a number of regions A1-A5. A respective region A1-A5 comprises a predetermined arrangement D1-D9 of items to be washed (cf. FIG. 3) from a number of predetermined arrangements D1-D9. In a third step S3, a cleaning matrix (MX (cf. FIG. 2) is determined which comprises an allocation of a treatment specification T1-T5 (cf. FIG. 2) to each of the regions A1-A5 in the map MAP of the arrangement of items to be washed. In a fourth step S4, the cleaning matrix MX is output, and in a fifth step S5 a wash program is executed on the basis of the cleaning matrix MX.

Although the present invention has been described with the aid of exemplary embodiments, it can be modified in numerous ways.

The invention claimed is:

1. A system, comprising:
a dishwasher including a receptacle for items to be washed;
an image capturing facility configured to capture an image of the receptacle, the captured image corresponding to a first view of the receptacle;
a transformation unit configured to generate a new image based on the captured image and to output the generated image, the generated image corresponding to a second view of the receptacle different from the first view of the captured image;
an image processing facility configured to determine in dependence upon the captured image or the generated image a map of an arrangement of the items to be washed, with the map comprising a division of the receptacle into a number of regions, each said region comprising a predetermined arrangement of items to be washed from a number of predetermined arrangements of items to be washed, each pixel of the captured image or the generated image being allocated to a respective predetermined arrangement of items to be washed to form each region of the map;
an allocation unit configured to determine a cleaning matrix, which comprises an allocation of a treatment specification to each of the regions in the map, and to output the cleaning matrix; and
a control apparatus configured to control at least one physical component positioned in the dishwasher to execute a wash program based on the cleaning matrix such that each region of the receptacle is treated based on a respective allocated treatment specification indicated by the cleaning matrix.

2. The system of claim 1, wherein the dishwasher is a household dishwasher.

3. The system of claim 1, wherein the transformation unit is further configured to transform the captured image and to output a transformed image in dependence upon the captured image and to output the transformed image, said image processing facility configured to determine the map based on the transformed image.

4. The system of claim 1, wherein the transformation unit comprises a neural network.

5. The system of claim 4, wherein the neural network is a generating generic network.

6. The system of claim 1, wherein the image capturing facility is arranged on the dishwasher in such a manner that the image capturing facility captures the image of the receptacle of the dishwasher from an upper hemisphere with regard to the receptacle.

7. The system of claim 1, wherein the transformation unit is configured to generate the generated image such that the generated image corresponds to a view of the receptacle from a lower hemisphere.

8. The system of claim 7, wherein the generated image corresponds to a view in a perpendicular manner from below.

9. The system of claim 1, further comprising a pattern recognition unit configured to recognize a pattern present in the captured image, in a transformed image, or in the generated image, and to output a pattern image that comprises the recognized pattern, said image processing facility configured to determine the map based on the pattern image.

10. The system of claim 1, wherein the image processing facility is configured to determine a type of items to be washed, a form of items to be washed and/or a material of items to be washed.

11. The system of claim 1, wherein the map comprises, at each point on the map, information relating to a type of items to be washed, a material of items to be washed, a form of items to be washed and/or a spatial orientation of the items to be washed at the point.

12. The system of claim 1, wherein the dishwasher includes a spray apparatus that is allocated to the receptacle for spraying washing liquor onto the items to be washed arranged in the receptacle, said spray apparatus being configured to allow adjustment of a position of the spray apparatus relative to the receptacle, and wherein the spray apparatus is part of the at least one physical component controlled by the control apparatus to execute the wash program.

13. The system of claim 12, wherein the spray apparatus includes a spray arm.

14. The system of claim 1, wherein the dishwasher includes a hydraulic system that comprises at least one intensive wash zone that is selectively activatable in dependence upon the map.

15. The system of claim 1, wherein treatment specifications are allocated to the regions, respectively, with each treatment specification establishing a parameter value from a predetermined value range and/or a temporal variation of the parameter value for one or multiple treatment parameters comprising a washing liquor spraying pressure, a washing liquor temperature, a spray apparatus position, a spray apparatus orientation and/or a duration during which washing liquor is sprayed.

16. The system of claim 1, wherein a specific treatment specification is allocated to a respective predetermined arrangement of items to be washed of the number of predetermined arrangements of items to be washed.

17. The system of claim 7, further comprising a facility external to the dishwasher and configured to integrate at least the image processing facility, said dishwasher including a communication unit configured to transmit the captured image to the external facility and to receive the map from the external facility.

18. A method for operating a dishwasher, said method comprising:
capturing an image of a receptacle of the dishwasher for items to be washed, the captured image corresponding to a first view of the receptacle;
determining a map of an arrangement of the items to be washed in dependence upon the captured image or a new image generated based on the captured image and corresponding to a second view of the receptacle different from the first view, with the map having a division of the receptacle into a number of regions, wherein each said region comprises a predetermined arrangement of items to be washed from a number of predetermined arrangements of items to be washed, wherein each pixel of the captured image or the generated image is allocated to a respective predetermined arrangement of items to be washed to form each region of the map;
determining a cleaning matrix, which comprises an allocation of a treatment specification to each of the regions in the map;
outputting the cleaning matrix; and
executing a wash program based on the cleaning matrix by controlling at least one physical component positioned in the dishwasher such that each region of the receptacle is treated based on a respective allocated treatment specification indicated by the cleaning matrix.

19. The method of claim 18 wherein the dishwasher is a household dishwasher.

20. A non-transitory computer readable medium, comprising a computer program product comprising commands which when executed by a computer, cause the computer to perform operations comprising:
capturing an image of a receptacle of a dishwasher for items to be washed, the captured image corresponding to a first view of the receptacle;
determining a map of an arrangement of the items to be washed in dependence upon the captured image or a new image generated based on the captured image and corresponding to a second view of the receptacle different from the first view, with the map having a division of the receptacle into a number of regions, wherein each said region comprises a predetermined arrangement of items to be washed from a number of predetermined arrangements of items to be washed, wherein each pixel of the captured image or the generated image is allocated to a respective predetermined arrangement of items to be washed to form each region of the map;
determining a cleaning matrix, which comprises an allocation of a treatment specification to each of the regions in the map;
outputting the cleaning matrix; and
executing a wash program based on the cleaning matrix by controlling at least one physical component positioned in the dishwasher such that each region of the receptacle is treated based on a respective allocated treatment specification indicated by the cleaning matrix.

* * * * *